United States Patent

Snyder, Jr.

[11] 3,880,483
[45] Apr. 29, 1975

[54] LOCKING DEVICE

[75] Inventor: Alan H. Snyder, Jr., Dallas, Tex.

[73] Assignee: Roberts Industries, Inc., Salina, Kans.

[22] Filed: Apr. 28, 1972

[21] Appl. No.: 248,573

[52] U.S. Cl. ............................................. 308/236
[51] Int. Cl. ........................................... F16c 33/30
[58] Field of Search ................................... 308/236

[56] References Cited
UNITED STATES PATENTS

| | | | |
|---|---|---|---|
| 1,788,891 | 1/1931 | Runge | 308/236 |
| 2,118,885 | 5/1938 | Hughes | 308/236 |
| 2,222,334 | 11/1940 | Brouwer | 308/236 |
| 2,835,519 | 5/1958 | Spicacci et al. | 308/236 |

FOREIGN PATENTS OR APPLICATIONS

| | | | |
|---|---|---|---|
| 498,399 | 10/1919 | France | 308/236 |

Primary Examiner—Charles J. Myhre
Assistant Examiner—Frank Susko
Attorney, Agent, or Firm—H. Mathews Garland

[57] ABSTRACT

A locking device especially adapted to secure relatively movable concentric members together. The device is particularly useful for locking a bearing on a shaft or within a housing. Broadly, the device includes a locking part disposed between first and second concentric members and biased into a frictional engagement with a first of the members so that when such member moves relative to the second member, the locking part is moved frictionally engaging the second member for locking the members together. In one form of the locking device a coil spring is wound about and frictionally engages a first member within a second member and has a tang engageable with a recess in the second member for interlocking the members responsive to rotation of the first member. Another embodiment of the locking device includes an arcuate-shaped spring having wedge portions engaging a first member within a recess of the second member. The recess of the second member is defined by eccentric arcuate locking surface portions converging toward the first member whereby the locking part is moved into wedging relationship between the first and second members for interlocking such members.

4 Claims, 28 Drawing Figures

LOCKING DEVICE

This invention relates to locking devices and more particularly relates to locking devices for interconnecting relatively movable concentric members. The locking device is particularly suited to the locking of a bearing on a shaft or within a housing.

It is a well known practice to use ball and roller bearings for rotatably supporting shafts and similar mechanical structure from some member of the apparatus involved. The shaft extends through an inner ring comprising the inner race of a bearing while the outer race of the bearing is secured in any suitable structure such as a housing. It is preferred that the inner race of the bearing and the shaft be locked together in some manner and the outer race and the housing be connected to minimize relative movement between the parts involved. The bore through the inner race may be sized to effect an interference fit on the shaft. This approach, however, presents problems both in bearing installation and when bearing removal is necessary. Another method of securing the inner race of a bearing on a shaft involves the use of a collar having an eccentric bore engageable with a mating eccentric outer surface on an end flange portion of the inner bearing race. A single radial set screw locks the collar on the shaft so that relative rotation of the inner race in the colloar tends to clamp the end of the inner race against the shaft. Rotation in the other direction, however, tends to loosen the collar on the shaft. Another method which has been widely used for securing an inner bearing race on a shaft is the use of at least two radial set screws which engage the shaft to hold the inner race against movement on the shaft.

The inertia of the inner ring or race of the bearing, and precision resulting from radial clearance between the shaft and the base of the inner ring since it rotates with the shaft, causes the race to tend to lag relative to the shaft so that there are constant forces between the inner race and shaft which must be opposed by whatever means is employed for connecting the race on the shaft. Both the collar method and the set screw method of connecting the race on the shaft have serious deficiencies. Both approaches fix the center line of the inner ring at an angle to the center line of the shaft proportional to the total radial clearance between the inner race bore and the shaft and inversely proportional to the length of the inner race along the bore of the race in contact with the shaft. This angularity decreases the useful life of the bearing and shaft assembly. The tightening of set screws on the shaft mars the surface of the shaft making removal of the bearing over the surface-damaged areas of the shaft difficult. The angularity or tilt between the inner race and the shaft tends to loosen the set screw or screws employed. Generally, particularly with equipment which is used a great deal, the bearings and shaft will eventually have to be replaced due to the damage which occurs both to the shaft and the inner race of the bearing.

A recently devised system for fixing the inner race of a bearing on a shaft employs two wedges which are secured along internal recesses of the bore of the bearing inner race for movement along eccentric surfaces of the recesses into a wedging relationship between the inner race and the shaft. The wedges comprise clips which extend radially around an end face of the inner race and longitudinally a short distance along the outer wall surface of the inner race so that a tool may engage the clips for forcing them into a wedging relationship between the shaft and the inner race. Such arrangement works reasonably well by effecting a wedging relationship at two angularly spaced locations around the inner race so that the shaft is forced against the inner race bore wall at a third location. Such system, however, has shortcomings including an inability to determine by visual inspection whether the inner race is properly locked on the shaft, a flange end extension is required on the inner race, and the external portions of each of the two clips creates a constant hazard as the race rotates with the shaft. The external portions of the clip readily will become entangled with any materials which might touch the shaft and bearing assembly such as rags, operator's clothing, and the like. A positive action in setting or driving the clips into wedging relationship is required to effectively lock the inner race of the bearing 18 the shaft.

It is an object of the present invention to provide a locking device for interconnecting two members.

It is another object of the invention to provide a locking device for interconnecting relatively movable concentrically disposed members.

It is an especially important object of the invention to provide a locking device for connecting the inner race of a bearing on a shaft and the outer race of the bering within a housing.

It is another object of the invention to provide a bearing locking device which minimizes tilt of the inner race of the bearing on a shaft and reduces shaft damage due to forces between the shaft and the bearing race.

It is another object of the invention to provide a locking device for connecting a bearing inner race on a shaft in a manner which causes engagement and tightening of the locking device responsive to the rotational force between the shaft and the bearing race.

It is another object of the invention to provide a locking device for locking a bearing inner race on a shaft against both rotational and axial movement.

It is a still further object of the invention to provide a locking device for connecting an inner race of a bearing on a shaft or the outer race of the bearing in a housing which is locked without positive external action or force.

It is another object of the invention to provide a locking device of the character described which has no external protruding parts creating safety hazards.

It is another object of the invention to provide a locking device of the character described which includes a coil spring to frictioally engage one of two members interconnected by the spring responsive to movement of the member.

It is another object of the invention to provide a locking device of the character described which includes an arcuate spring part having wedge portions disposed on and biased into frictional engagement with a first of two members and movable by such member to a wedging relationship between the first and a second member for frictionally engaging the second member to interlock the first and second members.

In accordance with the invention there is provided a locking device especially adapted to locking inner races or rings of bearings on shafts and for locking outer races or rings of such bearings within housings. Broadly, the locking device includes a locking part biased to frictional engagement with a first of two concentric relatively movable members for movement by the first member to a position at which the locking part engages the second of the members for locking the first and second members together. In one specific form of the locking device a coil spring is wound around a shaft in frictional engagement with the shaft surface, the coil spring having a cleat or tang extending into a recess within the second member for holding the spring against rotation within the second member. Rotation of the shaft tightens the spring on the shaft causing the spring to rotate with the shaft whereby the tang in the recess of the surrounding bearing inner race effects engagement with and rotation of the bearing race, thereby coupling the shaft with the race in response to rotation of the shaft. Various embodiments of the spring-type locking device provide for holding the shaft against longitudinal or axial displacement responsive to a tightening of the spring on the shaft effected by a longitudinal force applied to the shaft tending to move the shaft relative to the bearing inner race. In a further form of the spring locking device a pair of concentric springs are disposed around the shaft within the inner race of the bearing providing a lock between the shaft and the bearing which permits slight slippage between the shaft and the inner race as a safety feature which prevents spring damage under certain heavy load conditions. Still further forms of locking devices embodying the invention include arcuate shaped spring locking parts biased into engagement with the shaft within an internal recess of the inner race of a bearing, such recess being defined by eccentric arcuate locking surfaces causing a wedging of the locking part when the shaft rotates the locking part within the inner ring interlocking the shaft and inner race. The locking is responsive to shaft rotation and does not require prior wedging or setting of the locking part in the shaft and inner race. All forms of the locking device include a fully enclosed locking part having no projecting portions tending to rotate and become entangled with loose material such as rags and operator clothing.

The invention, together with its objects and advantages, will be more fully understood from the following detailed description taken in conjunction with the accompanying drawings wherein.

Figures 1, 2, 4, 5:
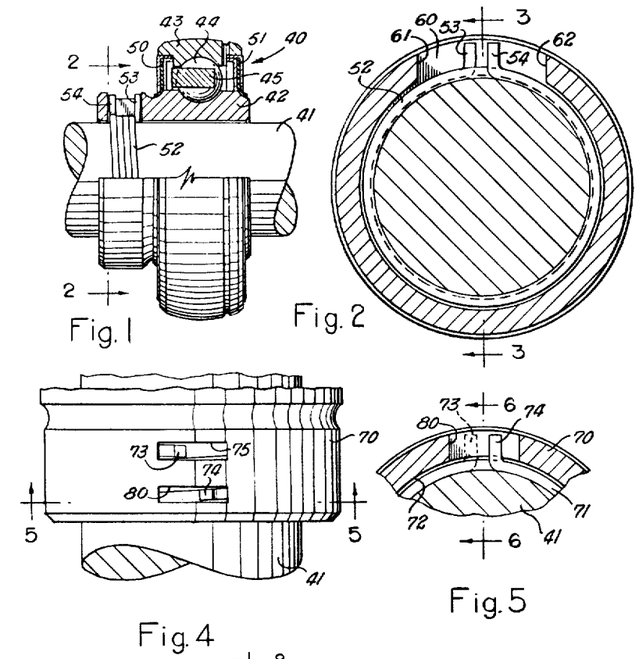
FIG. 1 is a side view in section and elevation of a typical ball bearing locked on a shaft by a single spring between the shaft and the inner race.
FIG. 2 is an enlarged view in section along the line 2-2 of FIG. 1.
FIG. 4 is a top fragmentary plan view of a modified form of a locking device using a single spring for both rotational and axial locking.
FIG. 5 is a fragmentary view in section along the line 5—5 of FIG. 4.

Referring to FIG. 1 of the drawings, a conventional ball bearing assembly 40 is shown locked on a shaft 41 in accordance with the invention. The bearing includes an inner race 42, an outer race 43, a plurality of balls 44, and a cage 45 for holding the balls in circumferentially spaced relationship around the annular space defined between the inner and outer races of the bearing. The bearing is sealed at opposite ends for holding lubricants in and dirt out by suitable seal assemblies 50 and 51.

In accordance with the invention, the bearing 40 is secured on the shaft 41 by a coil spring 52 which locks the shaft 41 with the bearing inner race 42. The spring 52 is preferably formed of rectangular wire wound to include a minimum of between two and three turns with opposite ends terminating in the vicinity of each other and provided with out-turned tangs 53 and 54. The spring is wound to a normal relaxed diameter slightly less than the diameter of the shaft 41 so that when the spring is wrapped around the shaft, as illustrated in FIG. 2, it frictionally grips the shaft 41 and thus is biased into engagement with the shaft. The resiliency of the spring causes it to wrap down on the shaft. The spring is disposed within an internal annular recess 55 in the inner race 42 which opens into a radial slot 60 defined circumferentially by end faces 61 and 62 and extending axially, as seen in FIG. 1, substantially the thickness of the coil spring 52. Stated quantitatively, as evident in FIG. 1, the axial thickness of the slot 60 is equal to approximately the cumulative thickness of five coils of the spring 52. As evident in FIGS. 2 and 3, the radial depth of the internal annular recess 35 in the inner race 42 is somewhat greater than the thickness of the wire forming the coil spring 52 so that the coils of the spring do not engage the inner ring with the spring coming in contact with the ring only along the tangs 53 and 54.

Figures 3, 6:
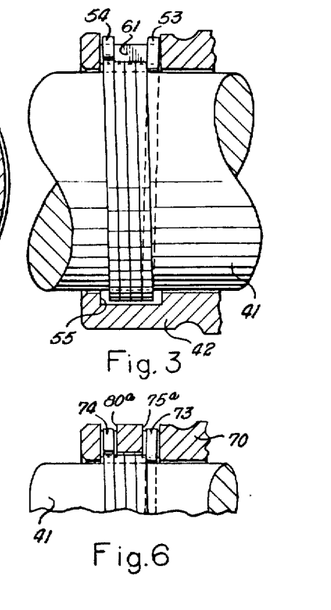
FIG. 3 is a view in section and elevation along the line 3—3 of FIG. 2.
FIG. 6 is a fragmentary view in section and elevation along the line 6—6 of FIG. 5.

The locking device illustrated in FIGS. 1–3 functions to lock the inner ring 42 on the shaft 41 irrespective of the direction of movement of the shaft. When the shaft rotates clockwise, as viewed in FIG. 2, the spring 52 is rotated with the shat until the tang 54 engages the lateral recess end wall 62 within the inner ring. Since the spring is sufficiently tight on the shaft to bias it into a frictionally engaging relationship on the shaft as the shaft rotates clockwise and the spring is held by the tang 54 engaging the surface 62, the spring tends to further tighten or wrap down on the shaft. This may be better recognized by visualizing the spring, as seen in FIGS. 1 and 3, with the shaft rotating in a direction so that the upper portion of the shaft is moving toward the observer. As the coils of the spring are frictionally engaged by the shaft surface, the spring tightens on the shaft more tightly gripping the shaft proportional to the relative force between the shaft and the inner race. As the force applied to the shaft increases, the spring wraps down tighter so that the shaft and the inner race are more securely coupled together. Irrespective of the relative force between the shaft and the inner race, the shaft and race will remain securely locked together unless such force exceeds the sheer strength of the spring 52 breaking the tang 54 from the spring. So long as the end of the spring at the tang 54 is held as described and the shaft is rotated clockwise, the spring firmly grips the shaft locking the inner ring on the shaft so that the ring rotates with the shaft. Subsequent to the engagement of the tang 54 with the surface 62 there is no slippage between the shaft and the inner ring. If the shaft is rotated in a counterclockwise direction, the spring turns with the shaft until the tang 53 engages the slot surface 61 of the inner ring so that the spring wraps down in the opposite direction firmly gripping the shaft and interlocking the shaft and inner ring.

The installation of the bearing 40 on the shaft 41 with the interlocking spring 52 is extremely simple. With the bearing off the shaft the spring is manipulated into the recess 55 and the tangs 53 and 54 inserted into the slot 60. After the spring is in the recess, the tangs 53 and 54 are spread apart by a suitable tool, such as a screwdriver, unwrapping or unwinding the spring to increase the diameter sufficiently to slide the shaft 41 through the bearing inner race and spring until the bearing is at the proper location along the shaft. The tool spreading the tangs is then withdrawn allowing the spring to contract on the shaft. No other installation steps are necessary. The spring effectively interlocks the shaft and bearing inner race for either direction of rotation of the shaft. The entire locking system is housed within the inner race without projecting obstructions creating a safety hazard. The locking system automatically engages the shaft and bearing race without external action or force such as driving of wedges into position or a similar positive installation step. Rotation in either direction effects the same tightening of the spring gripping action with full engagement between the entire periphery of the spring and the shaft irrespective of the direction of rotation of the shaft. The inner race does not tilt to the extent of conventional locking devices. The spring tabs 53 and 54 act as safety features which will shear when an excessive load is applied, thereby avoiding serious damage to the equipment.

FIGS. 4, 5, and 6 illustrate a modified form of bearing inner race locking device utilizing a single spring for locking the bearing and shaft both rotationally and axially. A bearing, not shown, of the nature illustrated in FIG. 1, has an inner race 70 somewhat longer than the inner race 42 shown in FIG. 1. The inner race 70 is locked with the shaft 41 by a spring 71 disposed around the shaft within an internal annular recess 72 of the inner race. The spring has a normal diameter slightly less than the diameter of the shaft so that it is biased into frictional engagement with the shaft when in locking relationship on the shaft as shown in the drawings. The spring 71 has a pair of end tangs 73 and 74 which hold the spring against both rotational and axial movement. The tang 73 projects radially outwardly into a lateral slot 75 in the inner race 70 opening into the internal recess 72 of the race. Similarly, the tang 74 extends radially outwardly into a recess 80 formed in the inner race axially spaced from the slot 75. The spring 71 functions to rotationally lock the lock the race 70 on the shaft 41 in the same manner as described with respect to the locking system illutrated in FIGS. 1–3. Clockwise rotation of the shaft, as viewed in FIGS. 4 and 5, causes the tang 74 to be rotated to the near edge surface of the slot 80 holding the spring as it is wrapped down by its frictional engagement on the shaft to tightly grip the shaft, thereby locking the ring 70 on the shaft during clockwise rotation. Similarly, counterclockwise rotation of the shaft 41 rotates the tang 73 to the near edge surface of the slot 75 the spring to wrap down on the shaft, more tightly gripping the shaft and locking the inner bearing race with the shaft during counterclockwise rotation. A particular feature of the locking system of FIGS. 4–6 resides in the holding of the shaft and inner race together responsive to axil loads. An axial load applied to the shaft directed toward the left, as seen in FIG. 6, causes the tang 73 of the spring to engage the slot face 75a holding the tang end of the spring against axial movement toward the left, while the force applied to the coils of the spring through the frictional engagement with the shaft causes the coils to tend to decrease in diameter more tightly gripping the shaft holding the shaft against axial movement in the inner race. Similarly, movement of the shaft relative to the race toward the right in FIG. 6 causes the tang 74 to engage the slot face 80a holding the tang end of the spring against axial movement to the right while the spring tends to stretch and thus decrease in diameter more tightly gripping the shaft to hold the shaft against axial movement toward the right. It is well known that a spring when stretched axially tends to decrease in diameter so that the individual coils of the spring thus stretch longitudinally or axially but contract radially or decrease effectively in diameter. It will be apparent that the axial spacing of the slots and the axial thickness of the slots must be such that the tang at the end of the spring from which the load is being applied is held against axial movement while the tang at the opposite end of the spring may move somewhat away from the holding slot to allow the spring to be stretched axially for contraction on the shaft. The greater the axial load applied, the more tightly the spring is wound down on the shaft. The spring 71 is installed in the same manner as described with respect to FIGS. 1-3. After manipulating the spring into the recess 72 in the inner race and inserting the tangs into the slots, the tangs may be effectively spread apart to increase the effective diameter of the spring sufficiently for insertion of the shaft through the inner race.

Figure 7:
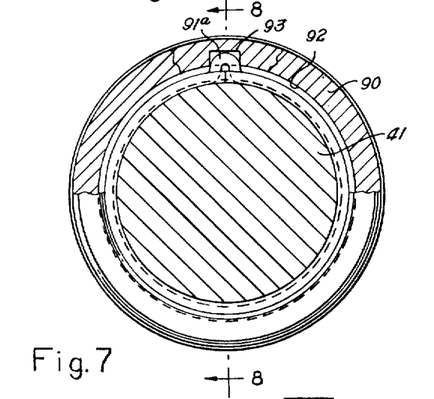
FIG. 7 is a view in cross section of another form of locking device utilizing a single spring.
Figure 8:
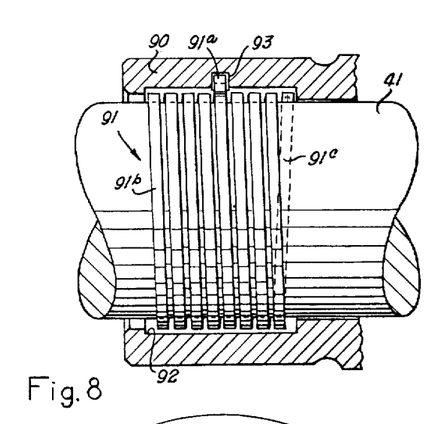
FIG. 8 is a view in section and elevation along the line 8—8 of FIG. 7.

FIGS. 7 and 8 illustrate a still further form of bearing lock employing a single spring to produce a dual spring effect. An inner race 90 of a bearing similar to that shown in FIG. 1 has an end flange somewhat greater in length than those of the previous embodiments. A spring 91 is disposed between the shaft and the inner race in an internal annular recess 92 within the inner race. The inner race also has an internal slot 93 opening into the recess 92 and located at the axial midpoint of the recess. The slot 93 is rectangular in shape having a long dimension extending circumferentially perpendicular to the axis of the inner race. The spring 91 is provided with a central kink 91a formed in the middle coil of the spring and extending outwardly for holding the spring against rotation in the inner race. The kink 91a effectively divides the spring 91 into a first end portion of half 91b, and a second end portion or half 91c, each of which serves the function of an independent spring depending upon the direction of rotation and the direction of axial forces applied to the shaft. The kink serves the same function as the end rangs on the previously described locking springs. When the shaft 41 is rotated in a clockwise direction relative to the inner race 90, as viewed in FIG. 7, the kink 91a holds the spring against rotation in the inner race while the frictional engagement between the shaft surface and the spring rotates the spring with the shaft. The end portion 91c of the spring is tightened on the shaft causing that portion of the spring to more securely grip the shaft locking the shaft with the inner race. An axial force applied to the shaft, as viewed in FIG. 8, toward the right causes the portion 91c of the spring to wrap down on the shaft holding the shaft against axial movement to the right relative to the inner race. The kink 91a of the spring is held against the axial movement by the right face of the slot 93 while the end portion 91c of the spring tightens down on the shaft. Similarly, counterclockwise direction of rotation of the shaft tightens the spring portions 91b, and an axial force on the shaft toward the left, as seen in FIG. 8, tightens the spring portion 91 b so that the shaft and inner race are locked together against both rotational and axial forces. The axial spacing between the spring turns, as shown in FIG. 8, has been found to increase the axial force which may be applied between the shaft and the inner race.

Figure 9:
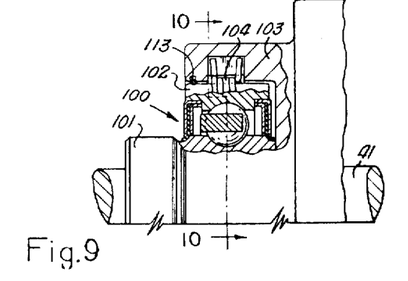
FIG. 9 is a fragmentary side view in section and elevation showing the locking of the outer race of a ball bearing within a housing in accordance with the invention.
Figure 10:
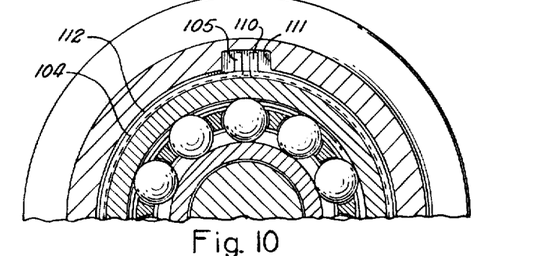
FIG. 10 is a fragmentary view in section and elevation along the line 10—10 of FIG. 9.

FIGS. 9 and 10 illustrate the application of the invention to a locking system for holding the outer race of a bearing within a housing. A ball bearing 100 of conventional design includes an inner race 101 secured on the shaft 41 by any suitable means such as the various embodiments of locking devices disclosed herein. The bearing has an outer race 102 which is locked within an annular housing 103 by a coil spring 104. The spring has end tangs 105 and 110 which project radially outwardly from the spring coils into an internal recess 111 formed in the housing 103 opening inwardly into an internal annular recess 112 in which the coils of the spring are disposed. The outer race is held against axial movement in the housing in a direction toward the left, as seen in FIG. 9, by a snap ring 113 fitting in aligned recesses of the bearing outer race and the inner face or bore surface of the housing. Rotation of the shaft and bearing in either direction tends to rotate the outer race of the bearing which is locked against such rotation within the housing by the spring 104. The spring is wound to a diameter slightly less than the outer diameter of the race 102 so that the spring is biased into frictional engagement with the race and is tightened further on the race by rotation of the race relative to the housing. Clockwise rotation of the shaft 41, as viewed in FIG. 10, tends to turn the outer race 102 to cause the tang 110 of the spring to engage the right face of the recess 111 holding the spring against further rotation and effecting a wrapping down or tightening of the coils of the spring on the bearing outer race, thereby interlocking the outer race and the housing. Similarly, rotation of the shaft and bearing in a counterclockwise direction causes the tang 105 to engage the recess surface effecting a wrapping down of the spring coils to hold the bearing outer race against counterclockwise rotation within the housing. The only slippage between the outer race and the housing is the circumferential movement permitted by the width of the recess or slot 111 and the positions of the tangs within the slot.

Figure 11:
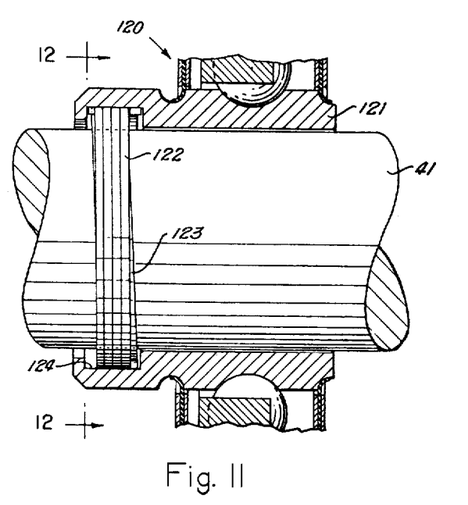
FIG. 11 is a side view in section and elevation of a still further form of spring-type locking device embodying the invention for locking a shaft within the inner race of a ball bearing.
Figure 12:
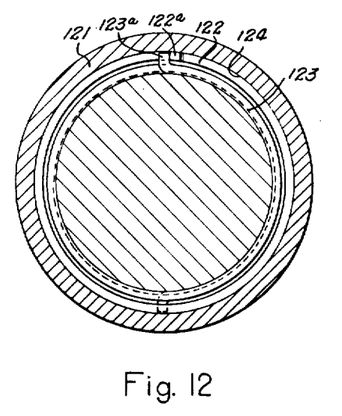
FIG. 12 is a view in section along the line 12—12 of FIG. 11.
Figure 13:
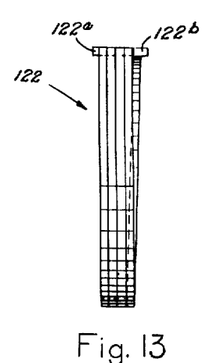
FIG. 13 is a side view in elevation of the outer spring of the locking device of FIG. 11.
Figure 14:
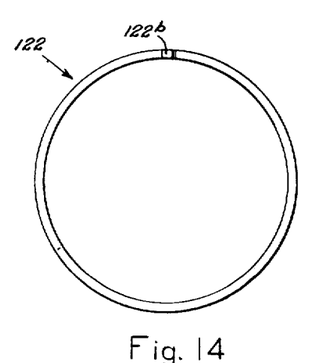
FIG. 14 is an end view in elevation of the spring shown in FIG. 13.
Figure 15:
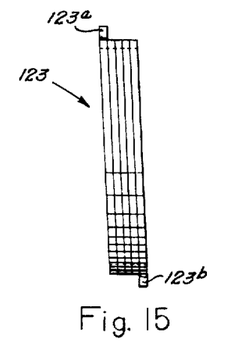
FIG. 15 is a side view in elevation of the inner spring of the locking device of FIG. 11.
Figure 16:
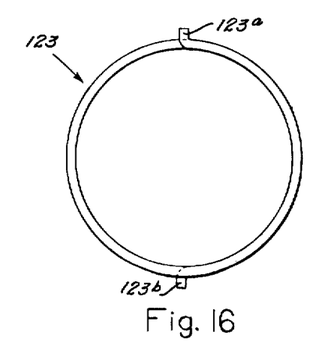
FIG. 16 is an end view in elevation of the spring shown in FIG. 15.

FIGS. 11-16 illustrate the application of the spring principle to a bearing locking system employing a pair of concentrically disposed springs between the shaft and a bearing inner race. Referring to FIG. 11, a ball bearing 120 has an inner race 121 secured on the shaft 41 by concentrically disposed outer and inner springs 122 and 123. The springs are positioned within an internal annular recess 124 of the bearing inner race 121. The outer spring 122 has opposite ends turned axially to form end tangs at 122a and 122b extending in opposite axial directions. The tangs are aligned axially within the cylindrical surfaces defined by the coils of the spring. The spring is wound to a diameter which forms an interference fit within the internal annular recess 124 of the bearing inner race 121. The inner spring 123 is provided with end tangs 123a and 123 b, both of which are turned radially outwardly as best seen in FIG. 16. The inner spring is wound to a diameter which forms an interference fit on the shaft 41.

When the shaft 41 is rotated, one of the inner spring tangs engages one of the tangs on the outer spring causing the inner spring to wrap down on the shaft and tending to unwind the outer spring causing expansion within the recess 124 to effect a tighter engagement with the inner race of the bearing. Specifically, if the shaft is rotated in a clockwise direction, as viewed from the left end of the shaft in FIG. 11, the tang 123a of the inner spring engages the axial tang 122a of the outer spring. The frictional engagement of the spring with the shaft causes the inner spring to wrap down on the shaft so that the spring rotates with and is frictionally locked to the shaft. The force applied from tang 123a of the inner spring to the tang 122a of the outer spring unwinds the outer spring which is in interference fit relationship within the recess 124 of the bearing inner ring 121. The unwinding of the outer spring expands the spring within the recess 124 gripping the bearing inner race 121 so that the shaft is locked with the bearing inner race by means of the inner spring 123 and the outer spring 122. Similarly, counterclockwise rotation of the shaft 41 turns the inner spring 123 with the shaft until the end tang 123b of the inner spring engages the axially extending end tang 122b on the outer spring. The resistance to the rotation of the inner spring provided by the engagement of the tang 123b with the tang 122b causes the shaft 41 to wind the inner spring down more tightly gripping the shaft and causing the coengaging tangs to tend to unwind the outer spring so that it more tightly grips the bearing inner race within the recess 124 coupling the shaft and inner race through the concentric springs responsive to the counterclockwise rotation of the shaft 41. The dual spring arrangement is particularly suitable for use under heavy load, low speed rotation conditions where the shaft tends to slip relative to the inner race. The outer spring tends to slip slightly within the inner race of the bearing so that loads which normally would shear the tang from one of the springs will not effect such a result in the dual spring locking system. Thus, a safety factor is inherent in the use of the concentric springs on heavy load applications.

Figure 17:
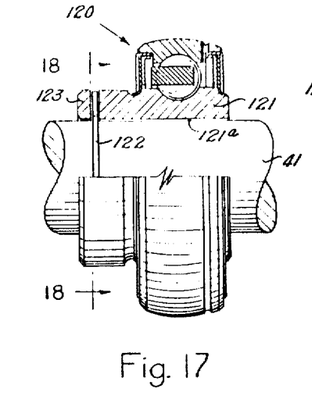
FIG. 17 is a side view in elevation and section showing the inner race of a ball bearing locked on a shaft in accordance with another form of the invention.
Figures 18, 19:
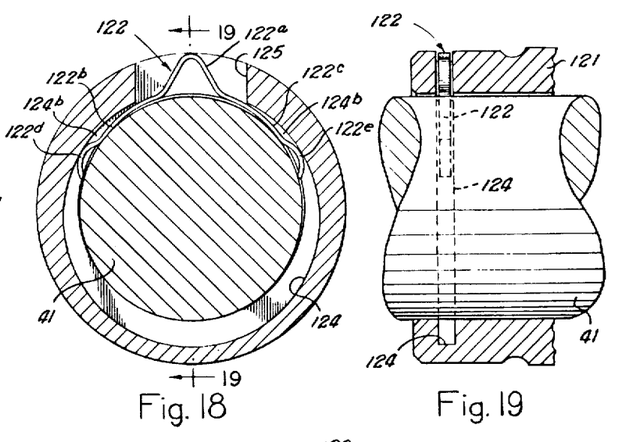
FIG. 18 is an enlarged view in section along the line 18—18 of FIG. 17.
FIG. 19 is a side view in section and elevation along the line 19—19 of FIG. 18.

Referring to FIGS. 17-19, a ball bearing 120 having an inner race 121 is interlocked with a shaft 41 by an arcuate spring locking part 122. The inner race has an end flange 123 provided with an internal recess 124 and a radical slot 125 opening through the race into the internal recess 124. The recess 124 is slightly longer measured axially than the width of the spring locking part 122, as evident in FIGS. 17 and 19, and is defined by an eccentric locking surface of circular shape formed on a center located below the axis of the bore 121a through the inner race, as seen in FIG. 18, so that when the shaft is disposed through the inner race, the annular space 124 narrows toward the slot 125. Thus, the recess 124 has neck or radially narrow portions 124a and 124b on either side of the slot. The locking part 122 is a spring member formed of a slender strip having a central loop 122a, side arcuate portions 122b and 122c, and inwardly bent end wedge portions 122d and 122e. The overall configuration of the locking part 122 is a partial circular shape formed on a radius slightly less than the radius of the shaft 41 so that when the locking part is within the recess 124 between the inner race and the shaft, the part is biased against the shaft frictionally engaging the shaft surface.

The locking system shown in FIGS. 17-19 interlocks the bearing inner race and the shaft responsive to rotation of the shaft in either direction. Viewing the locking system as seen in FIG. 18, when the shaft is rotated clockwise, the biasing of the spring locking part against the shaft causes the shaft to rotate the locking part with the shaft until the part wedges between the shaft and the inner race locking surface locking the shaft and the inner race together. The locking part is carried with the shaft until the wedge end 122d is moved into a wedging relationship in the recess neck 124b where the wedge end is lodged tightly between the shaft and the inner race frictionally locking the inner race on the shaft. Reversal of the shaft to rotate the shaft in a counterclockwise direction causes the shaft to carry the locking part with it counterclockwise disengaging the wedge end portion 122d from between the shaft and the inner race while rotating the other wedge end portion 122e of the locking part into the recess neck 124b where the wedge end is jammed tightly between the shaft and the inner race locking the shaft and inner race together. Thus, the inner race is locked with the shaft in either direction responsive to shaft rotation. At any time release of the inner race from the shaft is desired the central loop 122a of the locking part is depressed manually by a suitable tool such as a screw driver so that the end wedges of the locking part are moved farther into the recess 124 to wider portions of the recess at which the wedges are essentially free of the surfaces of the shaft and the inner race permitting disengagement of the inner race from the shaft. The biasing of the spring type part against the shaft surface permits the shaft to rotate the locking part into wedging relationship with either direction of shaft rotation without an initial setting of the wedge ends of the part in locking positions as required by presently known bearing locking systems.

Figure 20:
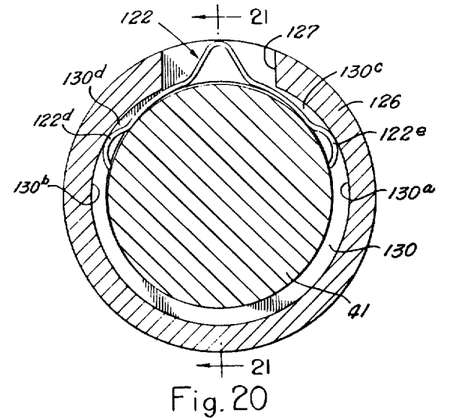
FIG. 20 is a view in section of a slightly modified form of the locking device in FIGS. 17-19.
Figure 21:
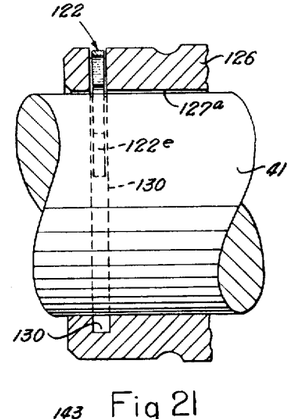
FIG. 21 is a side view in section and elevation along the line 21—21 of FIG. 20.

The bearing locking system of FIGS. 20 and 21 is identical to that shown in FIGS. 17-19 in all respects except that the internal recess in the inner race is defined by two eccentric surfaces formed on separate spaced centers. Referring to FIG. 20 a bearing inner race 121a having a slot 125 is provided with an internal recess 130 defined by two semicircular eccentric surfaces 130a and 130b generated about centers which are spaced on opposite sides of the axis of the center of the bore 127a through the inner race 126 of the bearing. As viewed in FIG. 20 the center of the surface 130a is spaced along a horizontal line extending through the axis of the bore 127a spaced to the right of the axis while the center of the eccentric surface 130b is along the same horizontal line to the left of the axis of the inner race bore. The outer surface of the shaft 41 and the eccentric recess surfaces define narrow neck portions 130c and 130d, respectively, to permit the wedge ends 122e and 122d to move into locking relationship along the shaft surface within the inner race recess. The locking system shown in FIGS. 21 and 20 operates in precisely the same manner as that of FIGS. 17 - 19 so that rotation of the shaft 41 in either direction couples the bearing inner race with the shaft.

Figure 22:
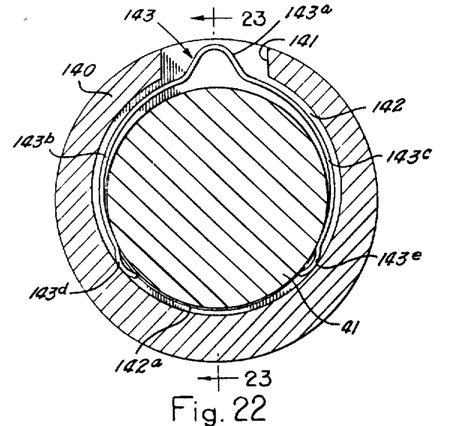
FIG. 22 is a view in section of a still further modified form of locking device embodying the invention for locking the inner race of a bearing on a shaft.
Figure 23:
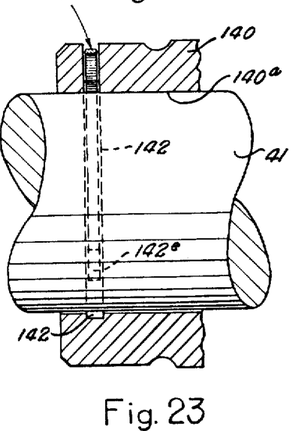
FIG. 23 is a view in section and elevation along the line 23—23 of FIG. 22.

The bearing locking system of FIGS. 22 and 23 includes bearing inner race 140 having a side slot 141 opening into an internal annular recess 142 defined by a circular locking surface generated about an axis aligned with and spaced above the axis of the bore 140a of the inner race so that a restricted area or space 142a is defined along the lower central portion of the shaft 41 when disposed through the bearing inner race. A spring locking part 143 is positioned within the recess 142 of the inner race around the shaft 41. The locking part extends approximately 270° around the shaft and includes a central loop 143a projecting into the inner race slot 141 and side arcuate portions 143b and 143c. The locking part has end wedge inwardly turned portions 143d and 143e which move into locking or wedging relationship between the shaft and the bearing inner race responsive to the direction of rotation of the shaft. The locking part is formed on a radius slightly less than the radius of the shaft so that when the shaft extends through the part the locking part is biased against the outer surface of the shaft. When the shaft rotates clockwise as seen in FIG. 22 the wedge and 143e is rotated into the resticted recess area 142a between the shaft and the bearing inner race locking the shaft and inner race together. Counterclockwise rotation of the shaft moves the wedge end 143d of the locking part into the restricted recess area 142a locking the shaft and bearing inner race together. For releasing the shaft from the inner race, the locking part 143 is lifted by grasping the loop 143a with a suitable tool retracting the end wedges 143d and 143e to positions permitting the shaft to be easily withdrawn from the bearing race. Similarly, in assembling the shaft and bearing race, the locking part is maneuvered into recess 142 of the race and then lifted by means of the central loop 143a to allow the shaft to be inserted through the inner race and locking part.

Figure 24:
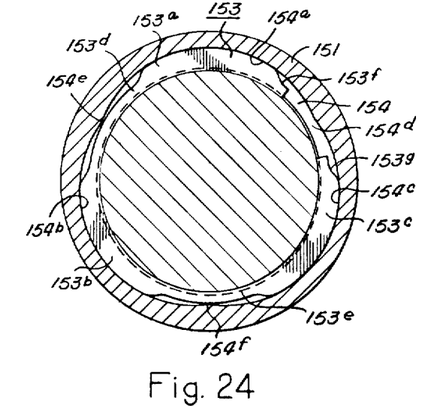
FIG. 24 is a view in section and elevation of another form of locking device for locking the inner race of a bearing on a shaft in accordance with the invention.
Figure 25:
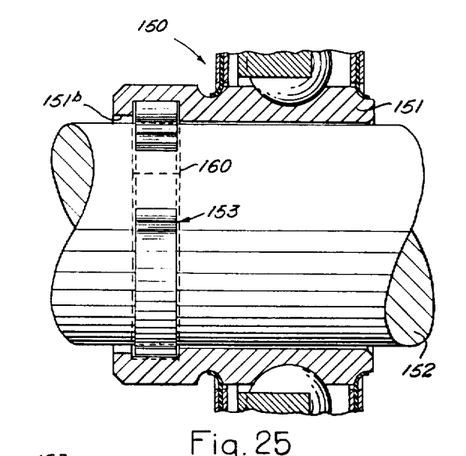
FIG. 25 is a fragmentary side view in section and elevation showing the locking device of FIG. 24 in the inner race of a ball bearing for locking the inner race on a shaft.
Figure 26:
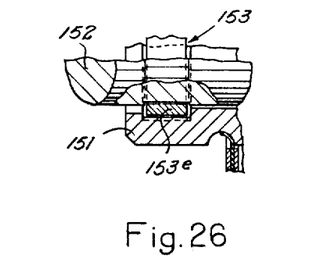
FIG. 26 is a fragmentary side view in section and elevation partially broken away showing a lower central portion of the locking device of FIGS. 24 and 25.

A still further form of bearing locking system is shown in FIGS. 24, 25 and 26. Referring to FIG. 25, a ball bearing 150 having an inner race 151 is secured on a shaft 152 by an arcuate three lobe locking part 153. The locking part comprises a ring-like segment which extends approximately 330° around the shaft including three wedge lobe sections 153a, 153b, and 153c, spaced approximately 120° apart. The wedges 153a and 153b are interconnected by a narrow arcuate section 153d of less radial thickness than the thickness of the wedge lobes. Similarly, the lobes 153b and 153c are connected by integral section 153e. The two free ends of the wedge member are effectively tapered by external edge reverse curve surfaces 153f and 153g. Similar surfaces bound the junctions of the wedge segments 153a, 153b and 153c with the intermediate integral connecting portions 153d and 153e so that the three lobes are symetrical circular segments of the integral locking part.

The locking part 153 is disposed within a recess 154 provided within the inner bearing race 151 and defined by three eccentric locking surfaces 154a, 154b, and 154c. The locking surfaces each is a cylindrical surface generated about an axis spaced toward the surface from the axis of the bore 151a through the bearing inner race and has a radius less than the radius of the bore of the inner race. The locking surfaces are spaced at 120° intervals and each extends 120° around the bearing inner race. The radii of the three eccentric surfaces are equal and are of a length which with the off center positioning of the axis lines of the surfaces produce the narrow space sections 154d, 154e, and 154f. The three locking part wedge lobes 153a, 153b, and 153c each disposed along one of the eccentric surfaces 154a, 154b, and 154c, respectively. The inner diameter of the locking part 153 is slightly less than the diameter of the shaft 152 and the wedge lock is disposed in a shallow external annular groove 160 of the shaft. The locking part is biased into engagement with the shaft surface around the groove 160. The groove 160 permits locking relative to thrust loads but is not required for rotational locking.

The locking part 153 is illustrated in FIG. 24 in a neutral position at which each of the wedge lobes is at the center of an eccentric locking surface. Upon rotation of the shaft in either direction, the locking part is rotated by the shaft until the three wedge segments each is moved into a wedging relationship within the recess 154 between the inner bearing race and the shaft. If the shaft is rotated in a clockwise direction, the wedge lobe 153a is rotated toward the narrow recess space 154d until the lobe is tightly engaged between the locking surface 154a and the shaft surface. Similarly, the wedge lobe 153b is moved into a locking relationship between the shaft and the inner race toward the narrow space portion 154e and the wedge lobe 153c is moved toward the narrow space 154f. Rotation of the shaft in a counterclockwise direction rotates the locking part with the shaft until the three wedge lobes are in locking engagement between the shaft along the three eccentric locking surfaces. The only slippage which occurs between the ring and the shaft is that permitted by the movement of the inner race and shaft until the wedge segments are in locking positions between the shaft and the race. The use of the three lobe locking part 153 provides substantial frictional engagement between the locking wedges of the part and the internal surface of the bearing inner race and substantial engagement between the locking part and the surface of the shaft 152 which minimizes any tendency to damage the shaft or the inner bearing race. The inner race of the bearing is counterbored at 151b leading into the recess 154 to facilitate the installation of the locking part in the race and to admit a suitable tool through the counter bore between the shaft and the inner race for slightly spreading the locking part by engagement of its free end to release the shaft from the locking part.

Figure 27:
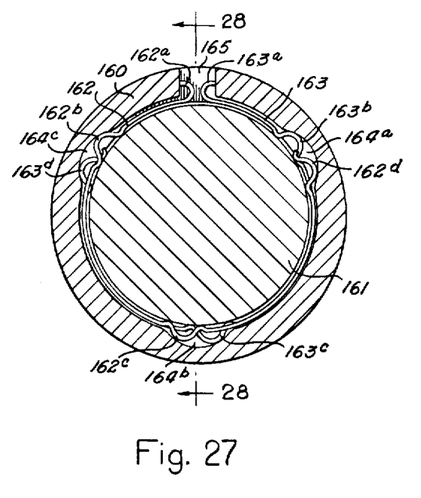
FIG. 27 is a view in cross section showing a further modified form of locking device for securing the inner race of a bearing on a shaft.
Figure 28:
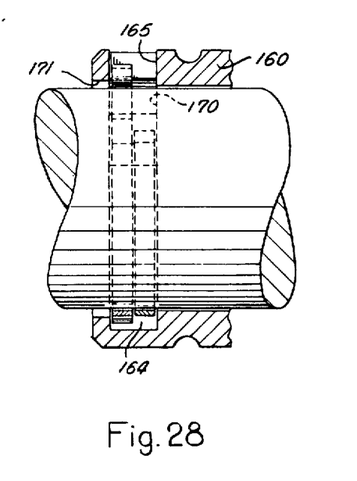
FIG. 28 is a side view in section and elevation along the line 28—28 of FIG. 27.

Another form of locking system for interconnecting the inner race of a bearing with a shaft is illustrated in FIGS. 27 and 28. A bearing inner race 160 is locked with a shaft 161 by a pair of resilient arcuate locking parts 162 and 163. The locking parts are disposed in an internal recess 164 provided in the inner race 160 communicating with a slot 165 through which the locking parts may be manipulated for release of the bearing from the shaft. The two locking parts 162 and 163 are positioned in circumferential overlapping relationship arranged axially side by side as seen in FIG. 28. The recess 164 of the inner race is basically an annular recess of uniform depth including arcuate enlarged locking surface portions 164a, 164b, and 164c circumferentially spaced at 120° apart around the inner race. The locking surfaces of the inner race recess are provided to accommodate wedging lobes on the two locking parts for wedging the lobes between the shaft surface and the locking surfaces to lock the inner race and shaft together during rotation in either direction of the shaft. The locking part 162 has a bent end portion 162a which engages one side of the recess 165 for manipulating the locking part when releasing the shaft and the bearing. The locking part 162 additionally has three arcuate outwardly extending wedge lobes 162b, 162c and 162d which are spaced at 120° intervals to correlate with the positions of the arcuate enlargements of the inner recess of the bearing inner race. The wedge lobes on the part 162 are positioned to provide wedging action during clockwise rotation of the shaft as viewed in FIG. 27 and thus are biased against the recess locking surfaces towards which the member is rotated when the shaft turns clockwise. The lobe 162d of the part 162 comprises an end of the part and as shown is disposed in the recess portion 164a. Similarly, the locking part 163 has a bent end portion 163a and circumferentially spaced wedge lobes 163b, 163c and 163d, reading clockwise in FIG. 27. The other end of the part 163 is formed by the wedge lobe 163d which is disposed in the recess enlargement 164c. The wedge lobes of the part 163 are positioned so that they effect wedging action when the shaft 161 rotates counterclockwise in the inner race. The two locking parts are positioned side by side around the shaft within a shallow annular recess 170 of the shaft. The inner race 160 of the bearing is counter bored at 171 to facilitate installation of the locking parts in the race. With both of the locking parts installed between the inner race and the shaft, the wedge lobe on one of the parts bears against the recess locking surfaces at first sides of the enlarged recess portions of the inner race while the wedge lobes of the other locking part each bear against the opposite side locking surfaces of the enlarged recess portions of the inner race. By so positioning the locking parts backlash between the shaft and the inner race is essentially eliminated as the wedge lobes on each part are disposed to essentially immediately wedge in locking positions responsive to shaft rotation in either direction. When release of the shaft from the bearing inner race is desired, a suitable tool such as a screw driver may be inserted into the slot 165 between the ends 162a and 163a of the locking parts. Applying circumferential forces to the two end loop end portions of the locking parts forces the locking parts surrounding the shaft in opposite directions towards the central portions of the recess portions 164a, 164b and 164c at which the wedge lobes do not bear tightly in wedging relationship against the shaft and the locking surfaces of the recess of the bearing inner race releasing the shaft and inner race from interlocked relationship.

In the various locking systems illustrated and described each bearing has been shown locked at one end only of the bearing inner race. With such a locking arrangement the tilt of the inner race is essentially cut in half as contrasted with normal conventional bearing locking systems. If desired, the bearing inner race may be extended on the opposite side of the bearing with a locking system installed in such extension so that the bearing inner race is locked at both ends of the bearing. Such an arrangement in terms of the system shown in FIGS. 24–26 would include an extension on the opposite side of the bearing inner race 151 including an inner recess corresponding to the recess 160 and the installation of a second locking part 153 in such recess so that the bearing inner race is locked by a pair of locking parts disposed at opposite ends of the inner race. This arrangement would essentially eliminate tilt of the bearing on the shaft. In each form of the system illustrated and described, the particular locking part employed is biased to a frictionally engaging relationship with one of the members being locked together while being movable by such member to a locking relationship with the other of the members responsive to relative movement between the members. More specifically, in bearing applications the locking part is biased to frictional engagement with the shaft going through a bearing and movable by shaft rotation relative to the inner race of the bearing to a position of interlocking relationship between the shaft and such bearing inner race. None of the locking systems intitial setting or locking of the shaft with the bearing inner race but are dynamically activated by shaft rotation to effect the desired locking. Bearing and shaft damage is essentially eliminated and part replacement, often required in conventional bearing locking devices, is thus also minimized, if not eliminated. In each of the locking systems the use of projecting part portions is not required and thus the locking systems render the bearings and shaft much safer. While certain forms of the invention show multiple locking lobes and eccentric locking surface, it will be recognized that more lobes may be used than illustrated and equal spacing is not essential. Also, in forms such as illustrated in FIGS. 24–26 showing three lobes a single lobe and corresponding locking surfaces are operable though not to be preferred.

What is claimed and desired to be secured by Letters Patent is:

1. A bearing locking system for locking an inner race of a bearing on a shaft comprising: means providing an internal annular recess within said inner race defined by spaced eccentric circumferential locking surfaces within said inner race providing a recess varying in radial depth from a minimum along spaced first circumferential portions of said recess to a maximum along spaced second circumferential portions of said recess, and locking means comprising an arcuate split spring locking part extending within said recess around a portion of said shaft biased into frictional engagement with said shaft and being movable by rotation of said shaft to a position between said shaft and said race for interlocking said shaft and said race, said locking part having locking wedge lobes along opposite end portions thereof, said locking part being positioned within said inner race around said shaft at a location at which said locking wedge lobes are each in one of said second portions of said recess of maximum depth, said wedge lobes being greater in radial dimension than the depth of said minimum recess portions whereby rotation of said shaft in either direction moves one of said wedge lobes into a wedging relationship between one of said locking surfaces of said bearing inner race and said shaft.

2. A bearing locking system in accordance with claim 1 wherein said locking part encompasses more than 180° of said shaft and the body portion of said part between said end lobes is disposed along the portion of said recess of maximum depth.

3. A bearing locking device for locking an inner race of a bearing on a shaft comprising: means providing an external annular recess in said shaft means providing an internal recess within said inner race aligned with said external recess on said shaft when said race is on said shaft said recess within said inner race of said bearing comprising three spaced portions of maximum depth defined by eccentric locking surfaces spaced at 120° intervals around said inner race and separated by portions of said space of minimum depth; and a split locking ring extending a major portion of the circumference of said shaft within said external recess around said shaft disposed within said recess within said inner race, said ring being formed of a diameter less than the diameter of said shaft at said external annular recess whereby said ring is biased into frictional engagement with said shaft when positioned around said shaft, said ring having three wedge portions spaced at 120° internals, each of said wedge portions having a radial dimension greater than the radial depth of said minimum depth portions of said recess and less than the radial depth of said maximum depth portions of said recess whereby rotation of said shaft in either direction moves said locking ring to a position for wedging said three wedge portions of said ring at locking positions along said recess of said inner race between said shaft and said inner race.

4. A bearing locking system in accordance with claim 3 wherein said locking ring is substantially rigid and incompressible along radial lines between said inner race and said shaft.

* * * * *